May 14, 1968 K. S. KORDIK 3,383,576
A.C. MOTOR STARTING ARRANGEMENT
Filed March 18, 1966 3 Sheets-Sheet 1
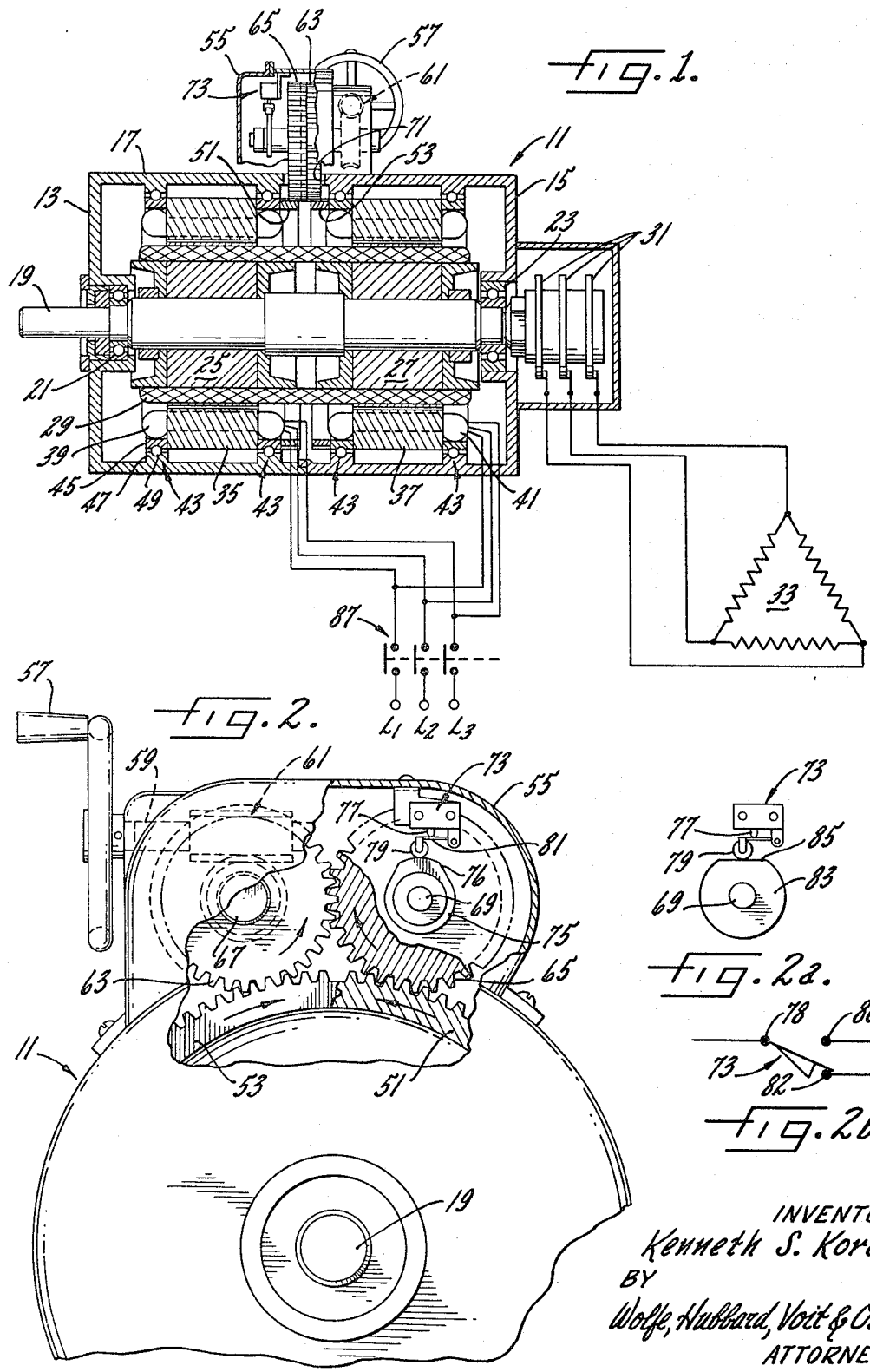
INVENTOR.
Kenneth S. Kordik,
BY
Wolfe, Hubbard, Voit & Osann
ATTORNEYS.

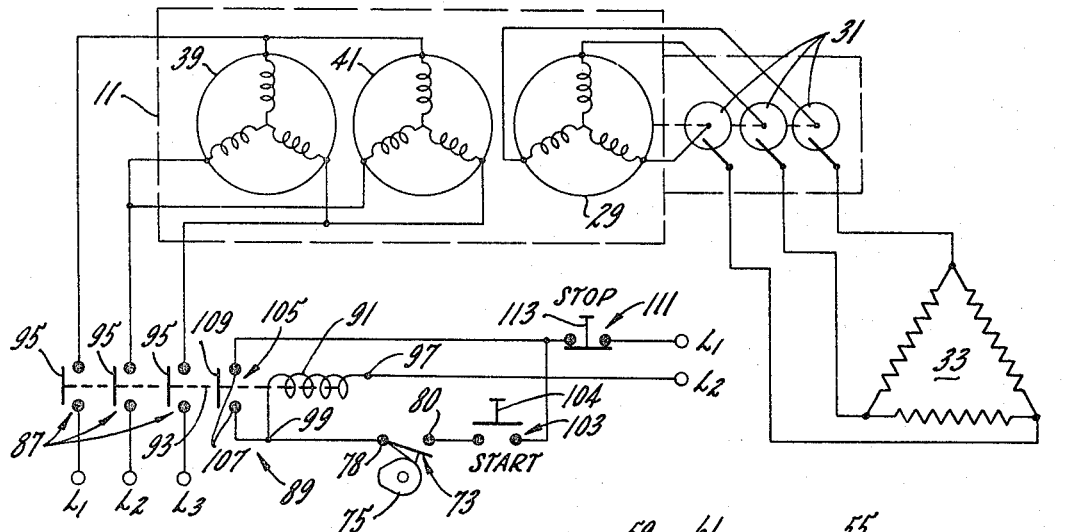
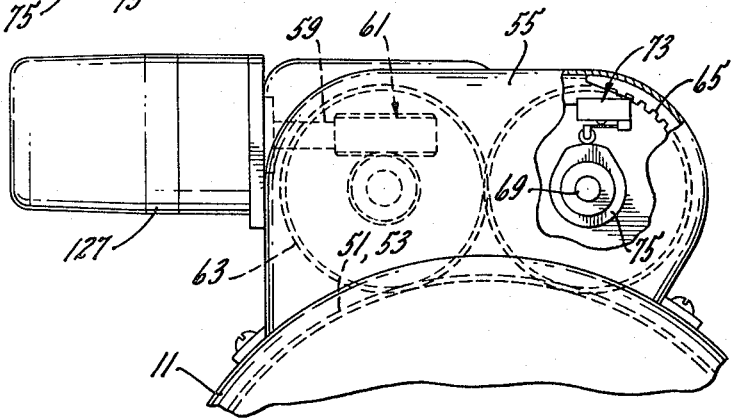
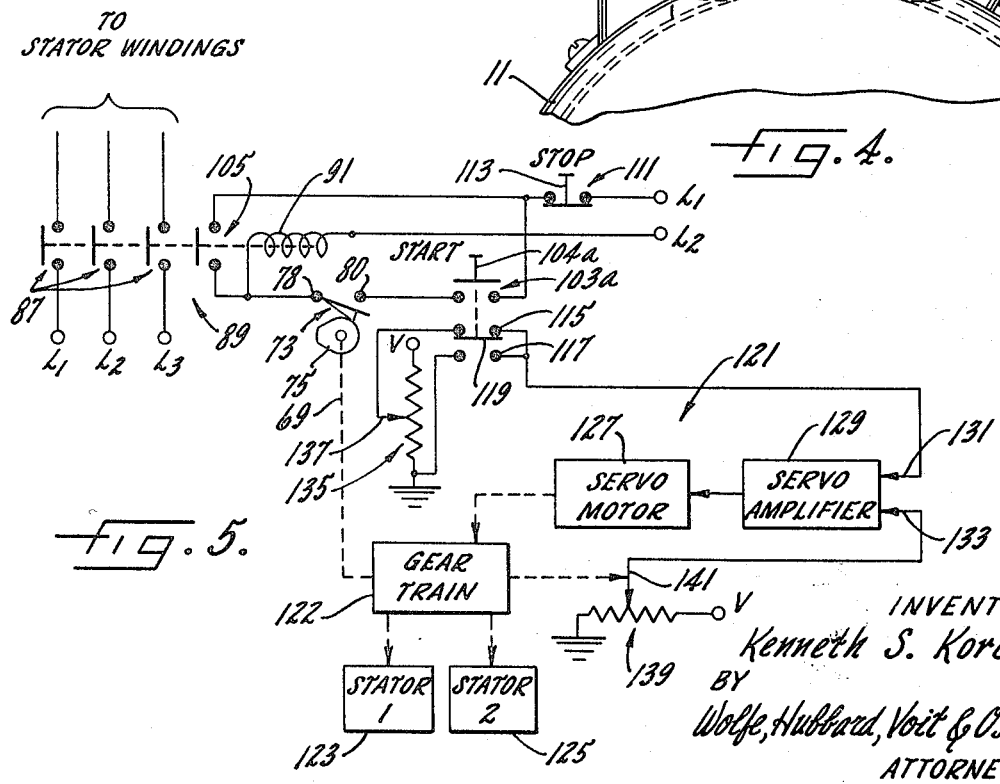

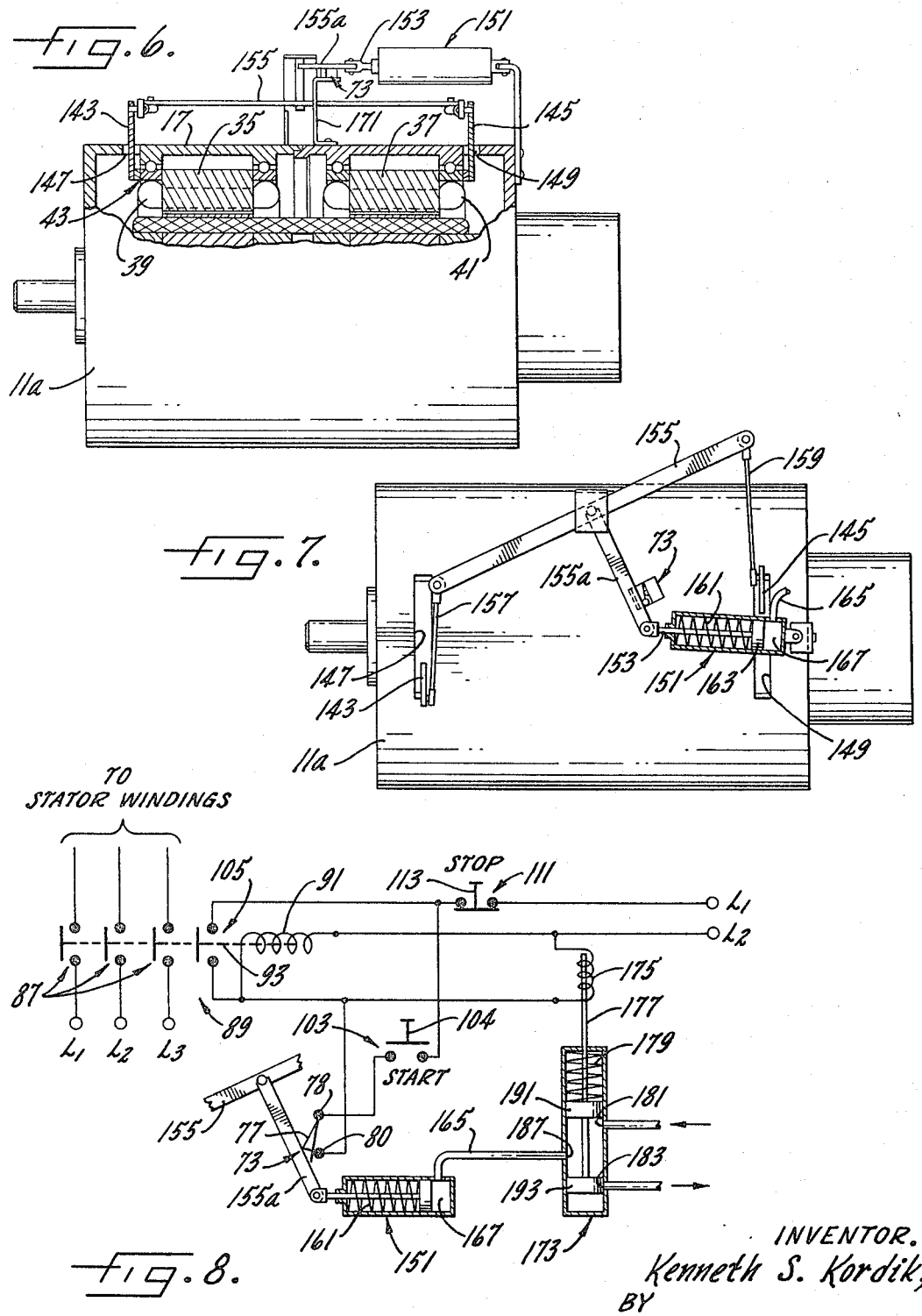

United States Patent Office 3,383,576
Patented May 14, 1968

3,383,576
A.C. MOTOR STARTING ARRANGEMENT
Kenneth S. Kordik, Rockford, Ill., assignor, by mesne assignments, to Bucyrus-Erie Company, South Milwaukee, Wis., a corporation of Delaware
Filed Mar. 18, 1966, Ser. No. 535,432
11 Claims. (Cl. 318—214)

This invention relates to a motor starting arrangement for an A.C. motor having a pair of stators of which at least one is shiftable so as to vary the torque between null and full torque. More particularly, this invention relates to a motor starting arrangement for variable torque shiftable stator A.C. motors which assures that the motor is not started in any but its minimum torque position.

A desirable and very useful development in the art of electric motors has been the variable torque, shiftable stator induction motor wherein a pair of stators individually induce a pair of voltages in a rotor with at least one stator being rotatable relative to the other so as to change the amount of induced current and torque from a minimum, when the rotating fields of the stators are out of phase with each other to maximum when the stators are so positioned as to bring their magnetic fields in phase with each other. The stators may be set anywhere between null and aligned position, before the motor is started. If the stators are in the null position when the motor is started, the initial torque put out by the motor is minimal. Conversely, if the initial setting of the stators is at full torque position when the motor is started, the motor will exert its full torque upon whatever load it is connected to. Similarly, an intermediate stator setting will result in an intermediate initial torque.

In applications where a high initial torque is not required, starting of a shiftable stator induction motor in any position other than null has several unnecessary disadvantages. A high initial torque will draw a heavy inrush of current which may cause power line fluctuations and which will subject the windings to unnecessary strains. Conversely, starting the motor in null position at minimum torque and then increasing the torque by gradually shifting the stators tends to greatly reduce inrush current and to reduce line fluctuations and winding strain because when the motor is started in null position, the inrush current in each stator is limited to the magnetizing current.

In addition to reducing line disturbances, and strain on the motor windings null stator position starting also reduces the initial shock exerted by the motor upon the load which it drives. This may be particularly important in particular applications of the motor. Thus, when used for running a pump, starting the motor in null position can prevent cavitation and hydrostatic shock in the pump. Null stator position starting is also important when the load is a conveyor belt since the initial shock upon the conveyor belt caused by a high torque start can cause excessive belt slip and stretch. With null stator position starting of the induction motor, the conveyor can be started gradually, preventing not only excessive belt slip and stretch but also avoiding the loss of material from the conveyor.

Accordingly, it is an object of this invention to reduce current inrush at starting and to eliminate load shock in a shiftable stator induction motor by assuring that the stators shall be at or near null position before the motor is started.

It is another object of this invention to reduce current inrush to and load shock caused by shiftable stator induction motors at starting through the expedient of interlocking starting current with stator position in such a manner that no starting current can flow to the stators until they have been brought into or near null position.

It is still another object of this invention to facilitate null position starting of shiftable stator induction motors by provision of a starting circuit which when actuated will automatically cause the stators to be rotated into null position as part of the starting operation before current is applied to them.

It is a further object of this invention to assure null position starting of shiftable stator induction motors through the provision of an automatic return-to-null device whereby stator position is brought back to null automatically every time the motor is stopped, thus assuring that the next time the motor is started the stators will be in null position.

Other objects and advantages of the invention will become apparent as the following description proceeds, taken in connection with the following drawings in which:

FIG. 1 is a longitudinal cross section of a shiftable stator induction motor embodying features of the present invention wherein the stators are rotated with respect to each other manually through a crank;

FIG. 2 is an end view of the motor shown in FIG. 1;

FIG. 2a shows a flat faced cam which may be used in place of the lobed cam shown in FIG. 2;

FIG. 2b is a schematic representation of the contacts of a typical pressure operated switch shown in FIGS. 2 and 2a;

FIG. 3 is a schematic drawing showing the windings of the motor of FIGS. 1 and 2 and also showing a motor starting circuit utilizing a cam operated limit switch as a null position interlock;

FIG. 4 is an end view of a motor similar to that shown in FIGS. 1 and 2 but having a stator shifting positioner operated by means of an electric motor;

FIG. 5 is a schematic diagram of a starting circuit for the motor shown in FIG. 3 with additional control means for automatically bringing the shiftable stators of the motor to null position when the start button of the motor is depressed;

FIG. 6 is a partially cut away side view of the motor substantially similar to the motor shown in FIGS. 1 and 2 except that the stators are shifted by a hydraulic actuator through arms mounted on the stators;

FIG. 7 is a top view of the motor shown in FIG. 6;

FIG. 8 is a schematic drawing of still another control circuit for automatically returning the stators of FIGS. 6 and 7 to null position when the motor has been stopped.

While the invention has been susceptible of various modifications and alternative forms, specific embodiments thereof have been shown by way of example in the drawings which will herein be described in detail. It should be understood, however, that it is not intended to limit the invention to the particular forms disclosed but on the contrary, the intention is to cover all modifications, and alternatives falling within the spirit and scope of the invention as expressed in the appended claims.

Referring now to the drawings and in particular to FIGS. 1–3, there is shown one type of shiftable stator induction motor generally designated as 11, to which the present invention is directed. The motor is housed in a pair of cup shaped members 13 and 15 interfitted to form a cylindrical housing 17. A rotor shaft 19 extends axially through the housing 17 and is journaled therein through a pair of bearings 21 and 23.

Shaft 19 carries a rotor assembly which includes two portions 25 and 27. Engaging both portions of the rotor is a winding 29 which is brought out through slip rings 31 and is usually connected in series with a resistor bank 33 for adjusting the running characteristics of the motor.

Spaced side by side in the frame and aligned with portions 25 and 27 of the rotor respectively are stator assemblies 35 and 37 having windings 39 and 41 respectively.

The stator windings 39 and 41 receive power from a polyphase power source, indicated as the terminals $L_1$, $L_2$, $L_3$, through a set of interrupt switches 87 which are closed to start the motor.

Stator windings 39 and 41 surround the rotor portions 25 and 27 in close proximity so that the rotating magnetic fields generated by the stator assemblies induce currents in their respective rotor portions, creating a secondary rotor field which interacts with the stator field to produce rotation of the shaft 19. Each of the stator assemblies 35 and 37 is rotatably mounted within the housing through a set of bearings 43, which may include an inner race 45 mounted on the stator assembly, and outer race 47 fastened to the housing 17 and a set of bearing balls 49 to maintain the inner race 45 centered within the outer race 47.

The torque of the motor 11 can be readily varied by selective rotation of the stator assemblies 35 and 37 relative to one another in order to adjust the electrical phase relation between the voltages which are induced by the stator windings 39 and 41 in the rotor winding 29. The stators may be oriented with respect to one another to produce a null phase position in which the voltage induced by the stators are of opposite phase and cancel one another so that zero torque applied is to the rotor. The stators also may be adjusted to another position in which the induced voltages are additive and produce maximum torque, or the stators can be adjusted for positions intermediate the maximum and null phase position for any of an infinite number of resulting voltages and torques.

To permit rotation of the stators with respect to each other, ring gears 51 and 53 are secured to the stator assemblies 35 and 37 respectively.

The stator assembly gears 51 and 53 are turned by a manually powered gear box contained in a housing 55 bolted on top of the motor 11. Rotary power is initially applied through a crank 57 mounted on a shaft 59 which is journaled for rotation in the housing 55. Through a worm gear assembly 61, the crank 57 turns one of a pair of intermeshed gears 63 and 65 of identical size mounted side by side on shafts 67, 69 which are rotatably mounted in the housing 55. The gear 63 which in FIG. 2 is the one driven by the worm gear 61 then drives the other gear 65 of the pair in a direction opposite to its own direction of rotation.

The gears 63 and 65 engage through an opening 71 in the top of the motor housing 17 the stator gears 51 and 53 respectively. As best seen in FIG. 2, regardless of which direction the crank 57 is turned, the gears 63 and 65 in the gear train will always drive the stator gears 51 and 53 together with their associated stator assembiles 35 and 37 in opposite directions with respect to each other.

Thus, by turning the crank 57 in a first direction the stator assemblies 35 and 37 may be turned toward null position, and by turning the crank 57 in the opposite direction the stator assemblies may be turned toward their full torque, or aligned position.

Typically, means (not shown) will be provided for limiting the range of travel of the gears 63 and 65 to positions which correspond at one extreme to null stator position, and at the other extreme to the aligned stator position.

In accordance with an important object of the invention, means are provided for preventing energization of the stator windings unless the stator assemblies 35 and 37 have first been brought into or near null torque position. In the embodiment shown in FIG. 2 this means includes a pressure operated switch 73 mounted on the gear train housing 55 and a cam 75 which rotates in unison with the stator assemblies 35 and 37 and which is operative through a lobe 76 to close the switch 73 when the stator windings 39 and 41 have been rotated into null position. The switch 73 may be of the well-known micro-switch type (FIG. 2b) having a plunger 77 which, when depressed, closes a pair of normally open electrical contacts 78 and 80, and opens a normally closed pair of electrical contacts 78 and 82 in the switch. Additionally, to facilitate cooperation between the cam 75 and the switch 73, a cam follower, such as roller 79 may be provided for engaging the cam surface, the roller 79 being mounted on an arm 81 pivoted on the switch 73 so that when the lobe 76 of the cam 75 raises the roller 79, the arm 81 will depress the plunger 77 causing the switch 73 to close, i.e., contacts 78 and 80 to close and contacts 78 and 82 to open.

The cam 75 is operatively connected to move in unison with the stators 35 and 37 by mounting it on a shaft upon which the gear 65 is rotated and by registering the lobe 76 of the cam 75 to press its follower 79 against the switch plunger 77 so as to close the switch 73 when the stators have been turned into null position.

An alternative to the switch actuating arrangement of FIG. 2 is shown in FIG. 2a wherein a flat faced cam 83 is used in place of the lobed cam 75 of FIG. 2. In a typical arrangement, the cam 83 of FIG. 2a would be mounted on the same shaft 69 upon which the lobed cam 75 is mounted and would be so oriented on the shaft that the flat face 85 is turned into contact with the follower 79 at the instant when the stator windings have been rotated within a predetermined angle from null position.

With the flat faced cam of FIG. 2a the normally closed contacts 78 and 82 of the switch 73 would be maintained open by the round surface of the cam 83 and would be allowed to close only when the roller 79 reaches the flat face 85 of the cam 83.

It may be readily seen that by making the lobe 76 of cam 75 or the flat 85 of cam 83 of the proper size, the range of torque values or stator settings for which the switch 73 will be closed can be selected. Thus with a very narrow lobe or flat on the cams 75 and 83 respectively the switch would be actuated only within narrow limits of null stator position.

Correspondingly, with a wider cam surface the range of torque settings for which the switch 73 will remain closed, and the motor started, will be larger.

A starting circuit incorporating the invention to assure null starting of a motor 11 of the type shown in FIGS. 1 and 2 is shown in FIG. 3 in schematic form. To help correlate the components shown in FIG. 3 to corresponding components shown in FIGS. 1 and 2, similar components will be designated by identical numerals.

As already stated in connection with the motor of FIGS. 1 and 2, rotor winding 29 is connected through a set of slip rings 31 to a torque regulating resistor bank 33. Stator windings 39 and 41 are powered from a three phase source indicated as terminals $L_1$, $L_2$, $L_3$, through interrupt switches 87. The interrupt switches 87 are part of a starting relay 89 having a winding 91 and an armature 93 carrying the movable contacts 95 of the interrupt switches 87 so that when the relay 89 is energized, the interrupt switches 87 are closed and three phase current flows to the stator windings 39 and 41.

Relay winding 91 is powered from a single phase source which may be the terminals L1 and L2 of the three phase source supplying the stator windings.

The relay winding 91 is connected through one of its terminals 97 to line L2. The other terminal 99 of the relay winding 91 may be connected to line L1 through either one of two circuits. The first circuit includes the normally open contacts 78 and 80 of the cam operated switch 73 and a normally open start switch 103, the latter having a "start" button 104, which, when depressed, closes the start switch. The second circuit includes a latching switch 105 having stationary contacts 107 mounted on the relay 89 and a movable contact 109 carried by the armature 93 of the relay. Both circuits are connected to the line L1 through a normally closed stop switch 111, having a "stop" button 113 which, when depressed, opens the stop switch 111.

With the switch contacts 78 and 80 closed due to null position of the stators, pressing of the start button 104 completes the circuit line from L1 through stop switch 111, start switch 103, contacts 78 and 80 of switch 73 and through the relay winding 91 to line L2. As a result, the relay 89 pulls in its armature 93 closing the interrupt switches 87 and the relay latching switch 105. Closing of the interrupt switches sends three phase current through the stator windings 39 and 41. Closing of the relay latching switch 105 causes current flow to be maintained through the relay winding 91 even after the start button 104 is released and the start switch 103 is opened so as to keep the starting relay 89 closed and the motor 11 to be energized.

To stop the motor 11 the stop button 113 is depressed, whereupon current through the relay latching switch 105 and through the relay winding 91 is cut off and the interrupt switches 87 are released so as to interrupt flow of current to the stator windings of the motor 11.

During the above explanation of the manner in which the starting circuit of FIG. 3 operates, it was stated that the stator windings were in null position so as to maintain the contacts 78 and 80 of the cam operated switch 73 closed. As a corollary to that statement and as an important feature of the invention as embodied in FIG. 3, the motor starting circuit is inoperative and will not start the motor 11 until the stators have been turned into null position. That is, if the stators are in any position other than at null, or within a predetermined angle of null, the cam operated switch 73 will remain open and will prevent flow of current through the relay winding 91 even though the start button 104 is depressed.

It is an important aspect of the invention that once the stator windings 39 and 41 have been turned into the position in which the cam 75 closes the null position interlock switch 73, the motor will start when the start switch 103 is closed and will remain running even through the stator windings 39 and 41 are thereafter rotated to some position other than that in which the switch 73 is maintained closed. Thus the null position interlock switch effects its purpose of preventing the motor 11 from being started unless the stator windings are at substantially null position without affecting the capability of adjusting the torque characteristics of the motor by shifting its stator windings after the motor has been started. This feature of the invention derives from the fact that the null position interlock switch 73 affects only one of the two circuits which serve to energize the relay coil 91; namely, the circuit which includes the start switch 103. The other circuit, which includes the relay latching switch 105 and which serves to maintain the relay closed after it has been initially closed by closing of the start switch 103 does not operate through the null position interlock switch 73 and hence will operate regardless of whether that switch is open or closed and will function to maintain the starting relay energized once the motor has been started regardless of subsequent shifting of the stators away from null position.

FIG. 3 shows the null position interlock switch 73 connected into the circuit through its normally open contacts 78 and 80, which are closed at null stator position by the lobe of the cam 75. It will be understood, however, that the flat faced cam 83, shown in FIG. 2a, may be used instead of the lobed cam 75, by connecting the normally closed contacts 78 and 82 of switch 73 with the circuit in series with the start switch 103. With this arrangement, as explained in connection with FIG. 2a, the circuit through the switch 73 would be closed only when the plunger of switch 73 is released into its normal position by the flat face 85 of the cam 83, indicating null stator position.

FIGS. 4 and 5 relate to still another form of the invention, whereby the stators of a shiftable stator induction motor are brought to null position automatically each time the motor is started.

The automatic null position starting circuit shown in FIG. 5 includes several of the components already discussed in connection with FIG. 3. Thus, the starting circuit includes a starting relay 89 with interrupt switches 87, stop switch 111 and cam operated null position interlock switch 73 interconnected and operating in the same manner as do the corresponding elements in FIG. 3.

The circuit of FIG. 5 also includes a start switch 103a which performs the same function as does the start switch 103 in FIG. 3. However, the start switch 103a of FIG. 5 is provided with additional second and third pairs of stationary contacts 115 and 117 and with a second movable contact 119 for bridging the second pair of stationary contacts 115 when the start button 104a is in its elevated position and for bridging the third pair of stationary contacts 117 when the start button 104a is depressed. These additional contacts of the start switch 103a are used in connection with a servo loop which serves to drive the shiftable stators of the induction motor 11 to any desired phase position.

The servo loop, generally indicated as 121, includes a gear train 122, such as that shown in FIG. 2, for driving a pair of stators 123 and 125 in opposite directions. In place of the hand-operated crank 57 shown in FIG. 2, a servo motor 127 is provided which may be mounted on top of the induction motor 11 in the manner shown in FIG. 4. The servo motor 127 is actuated by a servo amplifier 129 whose output is proportional to the difference between a command input signal received at its command input terminal 131 and a feedback signal received at its feedback input terminal 133. The command signal is derived from a command potentiometer 135 connected between ground and a voltage source V and having a wiper 137 connected through the second set of contacts 115 of the start switch 103a to the command input terminal 131 of the servoamplifier 129 so long as the start switch 103a is in its raised position. The feedback input is derived from a feedback potentiometer 139 also connected between ground and a source of voltage V and having a wiper 141 connected to the feedback input 133 of the servoamplifier. Wiper 141 is driven by the gear train 122 between its grounded terminal, when the stator windings are in null position and its second terminal, when the stator windings are in their maximum torque position.

It may thus be seen that by setting the wiper 137 of the command potentiometer 135 at its minimum setting nearest the grounded terminal, the servo amplifier will receive unequal inputs and will drive the servomotor 127 and the stators 123 and 125 until the stators have been rotated by the servomotor through the gear train 122 to their null position. thereby turning the wiper 141 of feedback potentiometer 139 to its minimum position nearest the grounded terminal of that potentiometer. Similarly, any other stator setting between null and maximum torque may be obtained by simply setting the command potentiometer wiper 137 at various other points along its range of travel.

The null position interlock switch 73 of FIG. 5 operates in the same manner as it does in FIG. 3. The cam 75 is connected to some portion of the gear train 122 which may be the shaft 69 upon which the gear 65 is mounted. (FIG. 4) Thus as described in more detail in connection with FIGS. 1 and 2, the cam will close interlock switch 73 only when the stators have been moved to their null position by the gear train 122. Thus the motor 11 cannot be started until that null position has been achieved.

In accordance with the invention, upon depressing the starting switch 103a a fictitious command signal representative of a desired null position is applied to the command input 131 of the servo-amplifier 129 so as to cause the servomotor to turn the stators 123 and 125 through the gear train 122 to their null position. This fictitious command signal is obtained by connecting one contact of the third pair of start switch 117 to the grounded terminal of the command potentiometer 135 and by connecting the other contact of the same contact pair 117 to the command input 131 of the servo amplifier 129. When the start switch 103a is depressed, the command potentiometer wiper 137 is disconnected from the servoamplifier command input 131 and that input is instead connected to the grounded end of the command potentiometer 135 which represents a zero or null torque position command and which will cause the servomotor 127 to drive the stators 123 and 125 to their null position.

The manner in which the circuit of FIG. 5 operates to bring the stators to their null position every time the motor is started will now be described.

Assume, for example, that the motor controlled by the starting circuit of FIG. 5 is stopped with its stators at some position other than null. If the stators are left in that poistion and the start button 104a is depressed, the motor will not turn since the null interlock switch 73 will prevent the starting relay from closing its interrupt switches 87 so that no current will be applied to the stator winding. The depressed start switch 103a will be effective to establish continuity through its third set of contacts 117 between the grounded terminal of the command potentiometer 135 and the servoamplifier command input terminal 131. As a result the stators 123 and 125 will be driven to their null position by the servomotor 127. When null stator position is attained, the cam 75 closed the null interlock switch 73 and, with the start switch 103a still depressed, a path is established from line L1 through the stop switch 111, the start switch 103a, the null interlock switch 73, and the relay winding 91 to line L2 whereupon the relay 89 is energized, the interrupt switches 87 are closed, and the motor 11 starts. The start switch 103a may then be released and the relay will be kept energized by its latching switch 105. Additionally, releasing of the start switch 103a reestablishes the connection between the command potentiometer wiper 137 and the servo amplifier command input 131 through the second pair of start switch contacts 115 returning the servoloop 121 to normal operation so as to drive the stators 123 and 125 to the position indicated by the setting of the command potentiometer wiper 137.

FIGURES 6 and 7 illustrate still a further embodiment of the invenution used with a shiftable stator induction motor which is electrically the same as the motor shown in FIGS. 1 and 2. However, the motor 11a of FIGS. 6 and 7 differs from that of FIGS. 1 and 2 in that its stators carry a pair of arms 143 and 145 instead of the gears 51 and 53. The arms 143 and 145 carried by the stator assemblies 35 and 37 respectively project upwardly outside the housing 17 through a pair of slots 147 and 149.

The stator assemblies 35 and 37 can be rocked within their bearings 43 by a fluid booster cylinder 151 mounted on top of the motor housing 17. The rod 153 of the fluid booster cylinder 151 operates upon the stator arms 143 and 145 through a T bar 155 rotatably mounted on top of the motor housing 17 with its arms linked to the stator arms 143 and 145 through a pair of links 157 and 159.

The slots 147 and 149 define the permissible range of travel of the stator assemblies 35 and 37 from full torque, with the stator arm 143 near the top end of the slot in FIG. 7 to a null torque position, with the stator arm 143 near the bottom end of slot 147 as it appears in FIG. 7. The stator assemblies are urged towards their null position by a spring 161 compressed in the booster cylinder 151 against piston 163 which is connected to the rod 153.

To rock the stator assemblies 35 and 37 away from their null position in which they are shown in FIG. 7, fluid (which may be either air or hydraulic fluid) is applied under pressure through the line 165 into the chamber 167 thereby forcing piston 163 against the pressure of the spring 161 so as to turn the T-bar 155 clockwise, as seen in FIG. 7.

In carrying out the invention, a pressure actuated switch 73 is mounted by means of a bracket 171 on top of the housing 17 in the path of travel of the center leg 155a of the T bar 155. Switch 73 may be of the same type as the similarly designated switch shown in more detail in FIGS. 2, 2a, and 2b. Referring to FIGS. 2 and 2a for the details of the switch 73, but with particular reference to its use in FIG. 7, switch 73 in FIG. 7 is oriented with its plunger 77 pointed towards the central leg 155a of T bar 155 and is so positioned that plunger 77 will be actuated by the leg 155a when the T-bar 155 has been rotated fully counterclockwise by the hydraulic cylinder 151; that is, when the stator assemblies 35 and 37 have been rocked into their null positions.

The manner in which the switch 73 operates in FIG. 7 to indicate null position of the stator assemblies 35 and 37 is similar to that shown in FIG. 2. So long as the stators are in null position, the plunger 77 of switch 73 is depressed (see FIG. 2) and the normally open contacts 78 and 80 of the switch (see FIG. 2b) is closed. Correspondingly, as soon as the stators are rocked out of null position by the fluid booster cylinder 151 the T-bar center leg 155a is rotated counterclockwise releasing the plunger 77 of the switch 73 and permitting its normally open contacts 78 and 80 to open.

FIG. 8 shows still another embodiment of the invention and relates in particular to a starting circuit for insuring that a motor of the type shown in FIGS. 6 and 7 will only be started when its stator windings are in null position and for automatically returning the stator windings to null position through appropriate control of the booster cylinder each time the motor is stopped.

Certain components of the starting circuit of FIG. 8 are identical to those shown in the starting circuit of FIG. 3 and for convenience will be designated by the same numerals as their counterparts in FIG. 3. The starting circuit will be explained in connection with a motor 11a of the type shown in FIGS. 6 and 7. For mechanical details, FIGS. 1 and 2 will also be referred to. For electrical details of the motor reference will be made to parts which are shown in FIG. 3. Current is applied to the stator windings 39 and 41 through a set of switches 87 carried by a relay 89 having a coil 91, an armature 93 and a self-latching switch 105.

To start the motor 11a (not shown in FIG. 8) the relay 89 is energized by depressing the start button 104 which closes a circuit from line L1 through the stop switch 111 and through the normally open contacts 78 and 80 of the interlock switch 73 when closed by the T-bar leg 155a through the relay coil 91 to the line L2. As a result, the relay armature 93 is pulled in, the interrupt switches 87 are closed, three phase current is applied to the stator windings 39 and 41 (FIG. 3) so as to start the motor 11a. Additionally, by closure of the latching switch 105, the starting relay 89 is maintained closed irrespective of subsequent opening of the contacts 78 and 80 due to subsequent shifting of the stator windings 35 and 37 away from null position. The motor is eventually stopped by depressing the stop button 113 which opens the stop switch 111 and interrupts flow of current through the latching switch 105 and the relay coil 91.

As described in connection with FIGS. 6 and 7, the stator rocking T-bar 155 is rotated clockwise, away from null position by a fluid booster 151 when pressurized fluid is admitted to the booster, and is rotated counterclockwise into null position under the influence of a spring 161 in the booster 151 when pressure to the booster is cut off.

In accordance with the present aspect of the invention, means are provided to cut off the supply of pressurized fluid to the fluid booster cylinder 151 whenever the motor 11a is stopped so as to automatically return the stators to their null position, ready for null position starting. In the embodiment of this aspect of the invention shown in FIG. 8 this automatic pressure cut-off is effected by means of a solenoid actuated valve 173 which is so controlled by the stop switch 111 that when that switch is depressed to stop the motor 11a, the valve 173 is closed so as to cut off pressurized fluid from the fluid booster 151.

Turning now to the details of the automatic return-to-null feature, pressurized fluid necessary to operate the hydraulic booster cylinder 151 is admitted to the chamber 167 of the cylinder 151 through the solenoid operated valve 173. The solenoid 175 of the valve 173 is connected across the relay winding 91 in series with switches 73 and 111 and is operative to pull up the plunger 177 of the valve 173 when the relay winding 91 and hence the solenoid winding 173 is energized. When the solenoid winding 175 is de-energized by switch 73 or by stop switch 111, the plunger 177 is depressed towards the bottom of the valve 173 under the action of a biasing spring 179 in the valve 173.

The valve 173 has two inlet ports 181 and 183 connected respectively to a source of fluid under pressure and to a reservoir where fluid may be discharged and an outlet port 187 connected to the hydraulic booster cylinder chamber 167 through the line 165. A pair of pistons 191 and 193 are carried by the plunger 177 inside the valve 173 and serve to connect one or the other of the inlet ports 181 and 183 to the outlet port 187 so as to pressurize or vent the booster chamber 167.

More particularly, the pistons are so positioned with respect to the inlet parts that when the solenoid 177 is energized, both pistons 191 and 193 are pulled upward with 191 being pulled away from its associated port 181 so as to open it and with the piston 193 being pulled over its associated port 185 so as to close it. Conversely, with the solenoid winding 175 de-energizing, the plunger 177 is pushed downward under the influence of the spring 179 and carries with it the pistons 191 and 193 so as to close the port 181 and open the port 185. Since the outlet port 187 is always open, it may be seen that when the solenoid 175 is energized, fluid under pressure is fed through the inlet port 181 and the outlet port 187 of the valve 173 into chamber 167 of the solenoid 151 thereby enabling the stator positioning booster 151 to operate. Conversely, when the solenoid coil 175 is de-energized, pressurized fluid is cut off from the hydraulic booster cylinder 151 and instead the chamber 167 is de-pressurized by venting through the line 165, the valve outlet port 187 and discharge port 183 so as to permit the spring 161 in the hydraulic booster 151 to return the stator windings through the T-bar 155 to their null position.

Turning now to the sequence of events which occur when the starter of FIG. 8 is used, let it be assumed that first the stator assemblies 35 and 37 have been rocked to their null position. When the start button 104 is depressed, relay coil 91 is energized, to send current to the stator windings, and the solenoid coil 175 is energized to send pressurized fluid through the valve 173 to operate the stator positioning fluid booster cylinder 151.

When it is desired to stop the motor, the stop button 113 is depressed causing current to be cut off from both the relay winding 91 and the solenoid 175 whereupon not only will the current be cut off from the stator windings so as to stop the motor, but pressure will also be automatically cut off by the solenoid operated valve 173 from the hydraulic booster cylinder 151 and the chamber 167 of the booster will be depressurized through the discharge port 183 of the valve 173 so as to permit the spring 161 to return the stators to their null position. There the stators will remain, until the next time that the motor is started.

I claim as my invention:

1. For use with a polyphase A.C. motor having a rotor winding and a pair of stator windings for inducing through individual rotating magnetic fields a pair of voltages in said rotor winding, at least one stator winding being rotatable to vary the position of said stator windings relative to each other between a null position in which the induced voltages are cancelled and an aligned position in which the induced voltages are added to produce maximum torque, a prescribed stator position starter comprising in combination;
   (a) a source of polyphase current;
   (b) control means for connecting said stator windings to said source of current;
   (c) motor starting means for actuating said control means;
   (d) means for initially disabling said control means for admitting current to said stator windings in any stator winding position other than a preselected relative stator winding position;
   (e) means for overriding said disabling means and for maintaining said control means actuated, in response to actuation of said control means so that once the control means has been actuated and the motor started with the stator windings in said preselected relative position, said control means remains actuated and continues to admit current to said stator windings regardless of subsequent shifting of one stator winding away from said preselected relative position.

2. The starter of claim 1, wherein said preselected relative stator winding position is substantially the null phase position.

3. The starter of claim 1, wherein said control means is a self latching relay and wherein said disabling means includes a switch connected to said relay to disable it when said switch is actuated and a cam linked to said switch and to said one stator winding so as to actuate said switch when said stator windings are in said preselected position.

4. The starter as claimed in claim 1 including means for automatically returning said stator to said preselected stator starting position.

5. For use with an A.C. motor having a rotor winding and a pair of stator windings for inducing through individual rotating magnetic fields a pair of voltages in said rotor winding, at least one stator winding being rotatable to vary the relative position of said stator windings between a null position in which the induced voltages are cancelled and aligned position in which the induced voltages are added to produce maximum torque, a null start circuit comprising
   (a) a starting relay having a coil, and a set of normally open switches connected in series with said stator windings so that said switches are closed when said relay coil is energized;
   (b) means for connecting said switches to a source of power so that when said relay is energized, power is applied to said stator windings to start the motor;
   (c) a motor starting switch for selectively connecting said relay coil to an energizing voltage source;
   (d) an interlock switch connected to said relay coil, said switch having a first position in which said relay coil is prevented from becoming energized and a second position in which said relay coil is permitted to become energized,
   (e) means for biasing said switch into its first position;
   (f) a cam associated with said switch and connected to move with said one stator winding so as to move said switch against said bias into its second position when and only when said stators are in null position; and
   (g) a latching contact on said starting relay connected between said relay coil and a source of power for overriding said interlock switch and for maintaining said relay coil energized once it has been permitted to become energized so that once the motor has been started with the stators in null position it may continue to run regardless of subsequent changes in the position of said one stator winding.

6. The null start circuit of claim 4 wherein the interlock switch is connected in series with the coil of the starting relay and wherein the interrupt switch is open in its first position and closed in its second position.

7. For use with an A.C. motor having a rotor winding and a pair of stator windings for inducing voltages in said rotor winding, one stator winding being rotatable relative to the other between a minimum torque, null position and a maximum torque, aligned position, a null positioning starting circuit comprising:
 (a) self-latching control means for connecting said stator windings to a source of power in response to an initiating current;
 (b) a starting switch for applying initiating current to said control means;
 (c) a cam-operated switch having contacts connected to said control means for permitting flow of initiating current through said control means when said stator windings are in null position and for preventing such flow when said stator windings are in any other position;
 (d) actuator means for moving one stator winding into a desired position relative to the other after said stator windings have been connected to a source of power; and,
 (e) null command means for automatically directing said actuator means to bring said one stator winding into null position with respect to the other stator winding before each energization of said stator windings.

8. The starting circuit of claim 6 wherein said actuator means comprises a servomechanism having an output geared to move said stator winding in response to a command signal representing the desired relative position of said stator windings and wherein said null command means includes a set of contacts on said starting switch for applying a null position command signal to said servomechanism when said starting switch is actuated but before current is applied to said control means.

9. For use with an A.C. motor having a rotor winding and a pair of stator windings for inducing through individual rotating magnetic fields a pair of voltages in said rotor winding, one stator winding being rotatable relative to the other between a minimum torque, null position and a maximum torque, aligned position, a null positioning starting circuit comprising:
 (a) motor starting means for connecting said stator windings to a source;
 (b) fluid operated means for moving said stator winding away from null position;
 (c) valve means connected to said fluid operated means for applying pressurized fluid thereto when said valve means is open;
 (d) motor stopping means for disconnecting said stator windings from said source of power and for closing said valve means; and
 (e) biasing means for returning stator winding to null position so as to place the motor in readiness for a subsequent starting operation with its one stator winding being in null position relative to its other stator winding.

10. For use with an A.C. motor having a rotor winding and a pair of stator windings for inducing through individual rotating magnetic fields a pair of voltages in said rotor winding, one stator winding being rotatable relative to the other between a minimum torque, null position and a maximum torque, aligned position, a null positioning starting circuit comprising:
 (a) self-latching control means for connecting said stator windings to a source of power in response to an initiating current;
 (b) a starting switch for applying an initiating current to said control means;
 (c) a two-position switch having contacts connected to said control means for permitting flow of initiating current through said control means when said switch is in a first position, and for preventing such flow when said switch is in a second position;
 (d) camming means linked to said one stator winding and controllingly coupled to said switch so as to guide it into its second position for all stator winding positions outside a predetermined angle of null and to guide it into its first position for all stator winding positions within said predetermined angle;
 (e) fluid operated means for moving said one stator winding away from null position;
 (f) electrically controlled valve means connected to said fluid operated means for applying pressurized fluid thereto when said valve means is opened;
 (g) a stop switch connected to said control means and to said valve means for deactuating said control means and for closing said valve means so as to remove power from said stator windings and pressurized fluid from said fluid operated means; and
 (i) a biasing means for returning said stator winding to null position when said valve means is closed.

11. For use with an A.C. motor having a rotor winding and a pair of stator windings for inducing through individual rotating magnetic fields a pair of voltages in said rotor winding, said stator windings being rotatable relative to each other between a minimum torque null position and a maximum torque aligned position, a null position starting circuit comprising
 (a) a self-latching control relay having a coil and an armature moved in response to current in said winding;
 (b) a start switch connected between said coil and a source of current for energizing said winding;
 (c) a latching switch including a pair of stationary contacts connected between said coil and a source of current and a movable contact carried by said armature and bridging said stationary contacts when said relay is energized for maintaining said relay energized;
 (d) a stop switch connected in series with said coil for unlatching said relay;
 (e) a set of switches on said relay, each switch comprising a pair of stationary contacts connected between a winding of said stator and a source of current and a movable contact carried by said armature and bridging said stationary contacts when said relay is energized for applying current to said stator;
 (f) a cam; and
 (g) a switch operated by said cam and connected in series with said start switch, said cam being interlinked with said stator windings so as to move therewith and being coupled to said switch so as to maintain said switch open in all positions of said stator except null so as to prevent starting of said motor in any stator position other than null without affecting the ability of the motor to keep running after it has been started regardless of the subsequent position of its stators.

References Cited
UNITED STATES PATENTS 3,290,574  12/1966  Roe _____ 318—214
3,340,450  9/1967  Stilley et al. _____ 318—314

ORIS L. RADER, *Primary Examiner.*

G. RUBINSON, *Assistant Examiner.*